United States Patent
Dudar (10) Patent No.: US 10,766,757 B2
(45) Date of Patent: Sep. 8, 2020

(54) METHOD AND SYSTEM FOR VEHICLE REFUELING

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 95 days.

(21) Appl. No.: 16/212,311

(22) Filed: Dec. 6, 2018

(65) Prior Publication Data
US 2020/0180939 A1    Jun. 11, 2020

(51) Int. Cl.
*B67D 7/04*      (2010.01)
*B60Q 1/26*      (2006.01)
*B60K 15/035*    (2006.01)

(52) U.S. Cl.
CPC .......... *B67D 7/0401* (2013.01); *B60K 15/035* (2013.01); *B60Q 1/2665* (2013.01); *B60Q 2400/50* (2013.01); *B67D 2007/0471* (2013.01); *B67D 2007/0474* (2013.01)

(58) Field of Classification Search
CPC .......... B67D 7/0401; B67D 2007/0471; B67D 2007/0474; B60Q 1/2665; B60Q 2400/50; B60K 15/035
See application file for complete search history.

(56) References Cited

U.S. PATENT DOCUMENTS

| | | | |
|---|---|---|---|
| 6,926,431 B1 | 8/2005 | Foote et al. | |
| 7,192,172 B1 | 3/2007 | Alberti | |
| 8,823,552 B1 | 9/2014 | Raphael et al. | |
| 9,216,646 B2 | 12/2015 | Yang et al. | |
| 9,457,651 B2 * | 10/2016 | Lindlbauer | B60K 15/05 |
| 9,709,006 B2 | 7/2017 | Peters et al. | |
| 2010/0321945 A1 * | 12/2010 | Lang | E05B 17/10 |
| | | | 362/501 |
| 2014/0191859 A1 * | 7/2014 | Koelsch | B60Q 1/2665 |
| | | | 340/455 |
| 2014/0320823 A1 * | 10/2014 | Ammar | B60Q 1/0023 |
| | | | 353/13 |
| 2017/0174074 A1 * | 6/2017 | Wakamatsu | B60K 15/03519 |
| 2018/0124213 A1 | 5/2018 | Wood | |

OTHER PUBLICATIONS

"NHTSA Sets 'Quiet Car' Safety Standard to Protect Pedestrians," Liever Hyman Potter Website, Available Online at https://www.lieverhymanpotter.com/blog/nhtsa-sets-quiet-car-safety-standard-protect-pedestrians/, Nov. 17, 2016, 5 pages.

* cited by examiner

*Primary Examiner* — Michael J Zanelli
(74) *Attorney, Agent, or Firm* — Geoffrey Brumbaugh; McCoy Russell LLP (57) ABSTRACT

Methods and systems are provided for improving customer satisfaction during a vehicle fuel tank refueling event. A customer refilling fuel in a fuel tank is provided a real-time update regarding the status of a fuel system, including a time remaining until the fuel tank is depressurized and ready to receive fuel. The update is provided visually by projecting the countdown on a ground surface via a puddle light, and acoustically via an external microphone or speaker of the vehicle.

20 Claims, 6 Drawing Sheets

METHOD AND SYSTEM FOR VEHICLE REFUELING

FIELD

The present description relates generally to methods and systems for providing auditory and visual feedback to a vehicle operator following a vehicle refueling request, particularly in a vehicle having puddle lights.

BACKGROUND/SUMMARY

Vehicle fuel systems include evaporative emission control systems designed to reduce the release of fuel vapors to the atmosphere. For example, vaporized hydrocarbons (HCs) from a fuel tank may be stored in a fuel vapor canister packed with an adsorbent which adsorbs and stores the vapors. At a later time, when the engine is in operation, the evaporative emission control system allows the vapors to be purged into the engine intake manifold for use as fuel.

One example of such a fuel system in a hybrid vehicle is shown by Peters et al. in U.S. Pat. No. 9,709,006. Therein, a latchable refueling valve is held in an open position to enable vapor flow from the fuel tank to a vapor canister. Responsive to fuel tank pressure being higher than a threshold after the valve is held at the open position for a pre-determined duration, the latchable refueling valve is moved to an unlatched position.

However, the inventors herein have recognized that in a hybrid vehicle, the fuel vapors stored in the canister may primarily be refueling vapors. The fuel tank isolation valve isolates fuel vapors generated in the fuel tank from running loss and diurnal temperature cycles. These fuel vapors are therefore not be transferred into the fuel vapor canister and, instead, are contained within the fuel tank via the closed isolation valve. Accordingly, pressure may build in the fuel tank and a higher pressure may exist within the fuel tank. When the vehicle operator indicates a demand to refuel the hybrid vehicle, the fuel cap may remain locked until venting of the fuel tank is allowed to sufficiently reduce tank pressure. As such, the fuel cap is unlocked only after the tank pressure is below a threshold pressure, protecting the vehicle operator from being sprayed with fuel vapor. As a result, the vehicle operator, or a gas station attendant (or other "customer"), may have to wait for a time until the fuel tank is ready for refueling. This may result in customer anxiety and dissatisfaction. For example, the customer may be confused as to why the refueling door has not opened. In some cases, the customer may be unaware that depressurization is ongoing and may press a refueling button on the vehicle dash multiple times to confirm or expedite the refueling, causing controller errors. While some operators may learn an average wait time for a given vehicle over time, operators using a car-shared vehicle or an autonomous vehicle may not be aware of the wait time, adding to the confusion.

The inventors herein have recognized that providing a visual and/or auditory feedback to the vehicle operator after a refueling request is initiated may enable operator anxiety and dissatisfaction to be reduced. For example, providing a countdown to a time when the fuel tank is ready to receive the fuel may allow a refueling event to be better managed. The inventors have recognized that a display related to the refueling request may be advantageously provided to a vehicle operator or gas station attendant via existing vehicle puddle lights. In particular, motor vehicles may be configured with so-called puddle lights which illuminate the immediate surroundings of the vehicle in the dark when the vehicle is being entered or exited. These lights, also referred to in the art as "ambient lights", can be mounted or inserted into the undersides of the door handles or exterior rear view (or side) mirrors so that they correspondingly illuminate the ground underneath. Frequently, these puddle lights are switched on when the doors are unlocked, for example by means of a remote key fob. By providing a display that is projected onto a ground surface via the puddle light, a vehicle operator and/or a gas station attendant may be updated of a time remaining until when the refueling can be performed. In one example, hybrid vehicle refueling is improved by a vehicle method comprising: responsive to a refueling request, estimating a time until a fuel tank is depressurized; and displaying the estimated time via a puddle light coupled to an exterior rear view mirror of the vehicle.

For example, in response to a refueling request, a vehicle controller may estimate a time required to depressurize the fuel tank. A countdown of the time remaining until the fuel tank is depressurized and ready to accept fuel is then displayed via the puddle lights onto a ground surface. For example, the countdown may be displayed on the ground outside a driver door. As another example, the countdown may be displayed on the ground outside a refueling door, which may be on the same side or the opposite side of the vehicle as the driver door. Further, a projection angle may be adjusted based on whether the driver is inside the vehicle or outside, as may be inferred from driver door angle. In addition to displaying the countdown with visual or animated cues, audible cues may be also be provided.

As a result, a vehicle operator and/or gas station attendant may be better appraised of a fuel tank depressurization progress during a refueling event. By providing a vehicle customer a real-time update regarding the progress of a fuel tank depressurization event, the customer may be better appraised of a time remaining before they can initiate refueling. By providing visual and/or audible cues, confusion and dissatisfaction for vehicle operators unfamiliar with the vehicle can be reduced, thereby averting premature opening of the fuel door. By acknowledging actuation of a refueling button and receipt of a refueling request via the visual and audible cues, repeated actuation of the refueling button by a vehicle operator is preempted. Overall, confusion related to refueling operations is reduced, and customer satisfaction is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
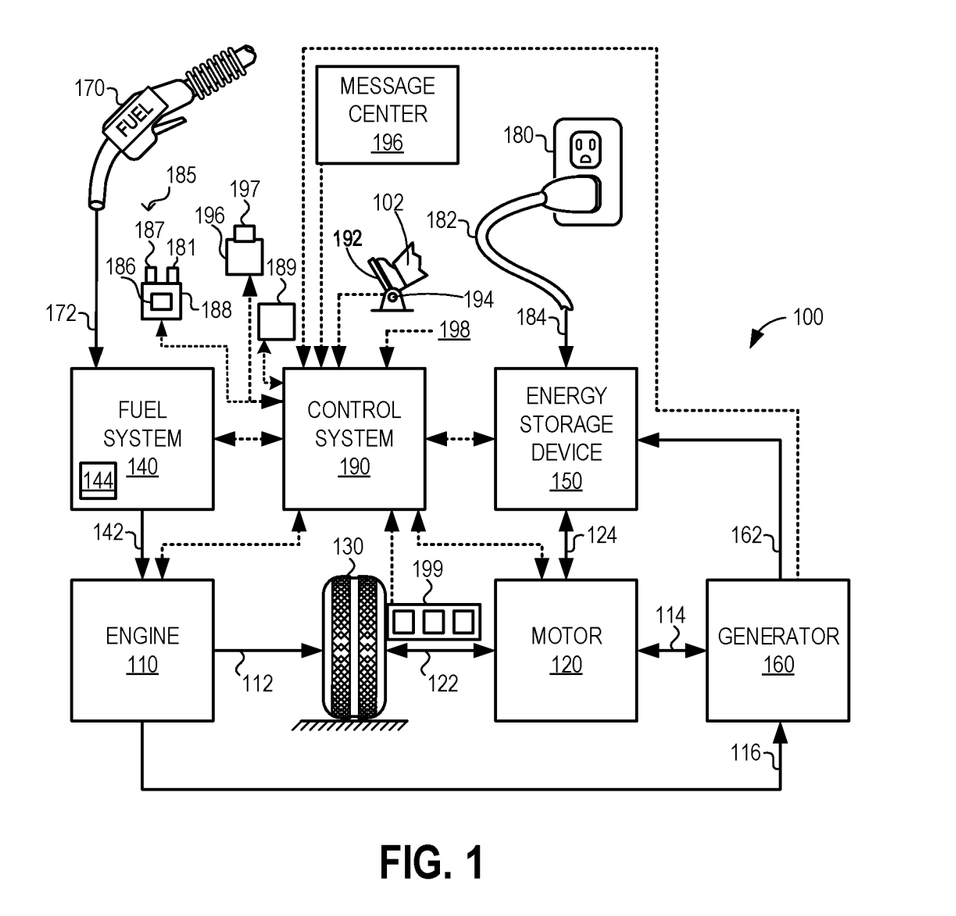
FIG. 1 shows an example vehicle propulsion system.

The following description relates to systems and methods for improving operator satisfaction during a fuel tank depressurization event in a hybrid vehicle system, such as in the vehicle system of FIG. 1. The fuel tank may be depressurized before fuel can be received in the fuel tank following a refueling request, such as in the fuel system of FIG. 2. Puddle lights installed in the vehicle system may be used to notify the vehicle operator and/or a refueling attendant of a fuel tank depressurization progress, as shown at FIGS. 3-6. The angle at which the fuel system status is projected on a ground surface may be varied as a function of a refueling door location on a vehicle body, as well as the status of a driver door, as shown at FIG. 7. A vehicle controller may be configured to execute a control routine, such as the example routine of FIG. 8, to depressurize a fuel tank responsive to a refueling request, and display a time remaining until the fuel tank can receive fuel via puddle lights installed on the vehicle.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle, such as from solar or wind energy. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

Vehicle propulsion system 100 may also include an ambient light system 185 coupled to a vehicle body. The ambient light system 185 may include a puddle light 186 mounted or inserted into an exterior rear view or side view mirror of the vehicle, such as a side mirror 188 positioned exterior to a driver door. As elaborated with reference to FIGS. 3-4, the puddle light 186 may be configured to aim at a ground surface, such as a pavement by which the vehicle is parked, so as to illuminate the immediate surroundings of the vehicle in the dark when the vehicle is being entered or exited. For example, the puddle light may illuminate the ground surface so that a vehicle operator can be aware of any puddles or other obstructions near the vehicle driver door. In one example, the puddle lights are switched on when the doors are unlocked during operator entry or exit from the vehicle, for example by means of a remote key fob. The puddle light may, optionally, display an image, such as a default manufacturer selected image (e.g., vehicle manufacturer logo). Alternatively, the displayed image may be selected by the vehicle operator in vehicle setting preferences. One or more sensors 187 may also be coupled to the vehicle body, such as to the driver door or the side mirror 188. Puddle light 186 may also be enabled responsive to opening or unlocking of the vehicle door, as inferred from sensor 187. As elaborated with reference to FIGS. 5-6, the inventors herein have recognized that the puddle light may also be used to display information pertaining to the fuel system to a vehicle operator. In particular, during a refueling event, the puddle light may also be used to display an amount of time remaining before fuel tank depressurization is completed and fuel can be received in the fuel tank. This allows a vehicle operator who is seated in the driver seat, or a gas station attendant (or the vehicle operator) standing outside the vehicle, to be aware of the progress being made so that they can start refueling the vehicle in a timely manner.

In some examples, side mirror 188 may also house a camera 181. For example, the camera 181 may be mounted on an underside of the side mirror or on a side surface of the mirror, facing the ambient environment (and not on the side facing the vehicle body). The camera 181 may be part of a blind spot monitoring system (or anti-collision system) that detects other vehicles located to the driver's side and rear (in the driver's blind spot). Based on images captured by the camera 181, a vehicle controller may warn the driver, through visual, audible, vibrating, or tactile cues, that there is a vehicle in the driver's blind spot. This may assist the driver is determining whether it is safe to change lanes. In addition, feedback from camera 181 may enable the vehicle controller to provide cross traffic alerts to the driver when backing out of a parking space, informing them if there is traffic approaching from the sides. As elaborated herein, during conditions when a fuel tank depressurization time is displayed via the puddle light system, a location and orientation of the displayed time may be adjusted based on the camera feedback. For example, feedback from camera 181 may be used to identify a location of a vehicle operator or refueling attendant, and a position and orientation of the depressurization time displayed via the puddle light may be adjusted relative to the position of the operator so as to enable the operator to be able to see the depressurization time clearly.

Vehicle propulsion system 100 may further include an acoustic vehicle alerting system 189 (AVAS) for alerting pedestrians outside the vehicle that a vehicle is nearby.

AVAS 189 may include various acoustic components coupled to the vehicle cabin and vehicle body exterior surface such as external speakers and external microphones. The speakers and microphones may be coupled to a front and a rear of the vehicle. The AVAS 189 may be a feature provided in particular in HEVs and start-stop vehicles since they tend to be very quiet due to reduced engine-on times. As an example, AVAS 189 may be mounted to an exterior of the vehicle system 100 and may pump engine noise to the external surroundings. AVAS 189 may also be configured to actively generate on-board noise when the vehicle speed drops below a threshold speed, such a s below 19 mph. As elaborated herein, during conditions when a fuel tank depressurization time is displayed via the puddle light system, the countdown may also be concurrently announced via AVAS 189 to inform the vehicle operator, audibly, of the amount of time needed before refueling can be initiated.

Figure 2:
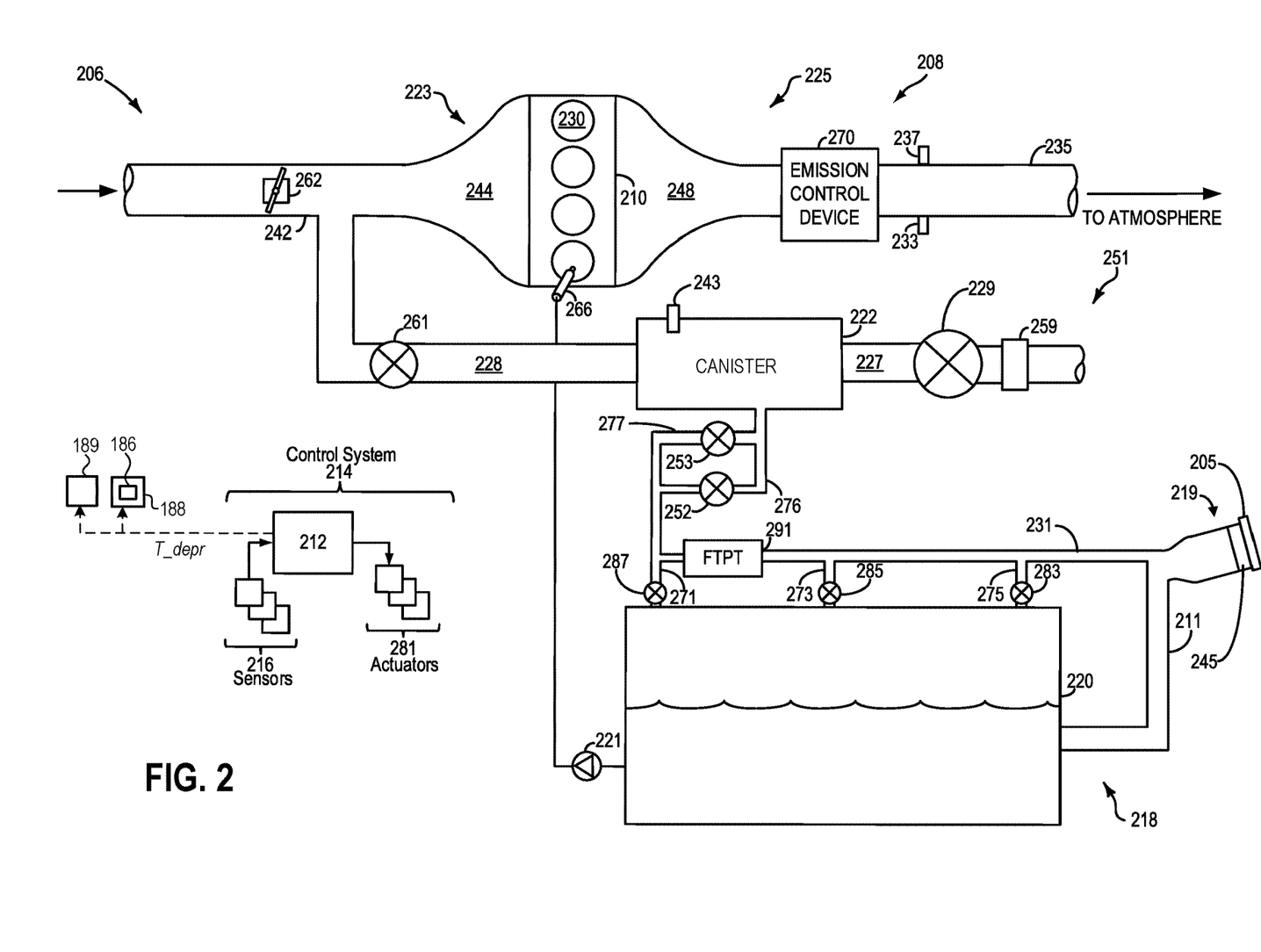
FIG. 2 shows an example fuel system and evaporative emissions system that may be coupled to the vehicle propulsion system of FIG. 1.

FIG. 2 shows a schematic depiction of a vehicle system 206. The vehicle system 206 includes an engine system 208 coupled to an emissions control system 251 and a fuel system 218. Emissions control system 251 includes a fuel vapor container such as fuel vapor canister 222 which may be used to capture and store fuel vapors. In some examples, vehicle system 206 may be a hybrid electric vehicle system, such as vehicle system 100 of FIG. 1.

The engine system 208 may include engine 210 having a plurality of cylinders 230. In one example, engine 210 includes engine 110 of FIG. 1. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. In one example, fuel tank 220 includes fuel tank 144 of FIG. 1. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system.

Vapors generated in fuel system 218 may be routed to an evaporative emissions control system 251 which includes fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves may be positioned in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe 211 or neck 211.

Further, fuel filler system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refueling request, e.g., a vehicle operator initiated request via actuation of a refueling button on a vehicle dashboard (such as refueling button 197 on dashboard 196 of FIG. 1), the fuel tank may be depressurized and the fuel cap unlocked after the pressure or vacuum in the fuel tank falls below a threshold. Herein, unlocking the refueling lock 245 may include unlocking the fuel cap 205. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more fuel vapor canisters 222 (herein also referred to simply as canister) filled with an appropriate adsorbent, the canisters configured to temporarily trap fuel vapors (including vaporized hydrocarbons) generated during fuel tank refilling operations and "running loss" vapors (that is, fuel vaporized during vehicle operation). In one example, the adsorbent used is activated charcoal. Emissions control system 251 may further include a canister ventilation path or vent line 227 which may route gases out of the fuel vapor canister 222 to the atmosphere when storing, or trapping, fuel vapors from fuel system 218.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions (such as certain engine running conditions) so that vacuum from engine intake manifold 244 is applied on the fuel vapor canister for purging. In some examples, vent line 227 may include an optional air filter 259 disposed therein upstream of canister 222. Flow of air and vapors between canister 222 and the atmosphere may be regulated by a canister vent valve 229.

Fuel tank 220 is fluidically coupled to canister 222 via a first conduit 276 which includes a fuel tank isolation valve (FTIV) 252 for controlling the flow of fuel tank vapors into canister 222. FTIV 252 may be normally closed so that fuel tank vapors (including running loss and diurnal loss vapors) can be retained in the fuel tank, such as in the ullage space of the fuel tank. In one example, FTIV 252 is a solenoid valve.

In configurations where the vehicle system 206 is a hybrid electric vehicle (HEV), fuel tank 220 may be designed as a sealed fuel tank that can withstand pressure fluctuations typically encountered during normal vehicle operation and diurnal temperature cycles (e.g., steel fuel tank). In addition, the size of the canister 222 may be reduced to account for the reduced engine operation times in a hybrid vehicle. However, for the same reason, HEVs may also have limited opportunities for fuel vapor canister purging operations. Therefore the use of a sealed fuel tank with a closed FTIV (also referred to as NIRCOS, or Non Integrated Refueling Canister Only System), prevents diurnal and running loss vapors from loading the fuel vapor canister 222, and limits fuel vapor canister loading via refueling vapors only. FTIV 252 may be selectively opened responsive to a refueling request so depressurize the fuel tank 220 before fuel can be received into the fuel tank via fuel filler pipe 211.

A pressure control valve (PCV) 253 may be configured in parallel with FTIV 252. PCV 253 may be controlled by the powertrain control module (e.g. controller 212) using a pulse-width modulation cycle to relieve any excessive pressure generated in the fuel tank, such as while the engine is running or even vent excessive pressure from the fuel tank when the vehicle is operating in electric vehicle mode, for example in the case of a hybrid electric vehicle. In addition, following a refueling request, PCV 253 may be opened in addition to FTIV 252 to reduce the time for fuel tank de-pressurization prior to refueling.

When opened, FTIV 252 and PCV 253 allow for the venting of fuel vapors from fuel tank 220 to canister 222. Fuel vapors may be stored in canister 222 while air stripped off fuel vapors exits into atmosphere via canister vent valve 229. Stored fuel vapors in the canister 222 may be purged to engine intake 223, when engine conditions permit, via canister purge valve 261.

In alternate examples, a single fuel tank isolation valve (FTIV) may be coupled between fuel tank 220 and fuel canister 222 (or between fuel tank 220 and purge line 228 or vent line 227), and no PCV may be included. However, a continuous supply of voltage may be demanded by the FTIV when it is held open to depressurize the fuel tank. This continuous voltage may increase power consumption.

In the depicted example, fuel system 218 is fluidically coupled to emission control system 251 by each of solenoid valves FTIV 252 and PCV 253. In one example, FTIV 252 may have a smaller orifice and a smaller aperture than PCV 253. PCV 253 may be configured to allow a higher flow rate than FTIV 252. During refueling events, and when pressure in fuel tank 220 is higher than a pressure threshold, FTIV 252 may be opened first to decrease the pressure in fuel tank 220 to the pressure threshold. As mentioned earlier, FTIV 252 may have a smaller orifice diameter than the orifice diameter of PCV 253. Thus, by opening FTIV 252 first, the pressure in the fuel tank may be bled down gradually (e.g., to a first threshold pressure). PCV 253 may then be opened to vent fuel vapors from fuel tank 220 to canister 222 at a faster rate (e.g., to a second threshold pressure, lower than the first threshold pressure) to enable a faster and/or further depressurization of the fuel tank.

Refueling lock 245 may be unlocked to open a fuel cap only after fuel tank is sufficiently depressurized, such as below the second threshold pressure. Fuel tank pressure at which the PCV 253 is opened (e.g., the first pressure threshold) may be higher than the fuel tank pressure when the refueling lock 245 is unlocked (e.g., the second pressure threshold).

After an operator requests refueling, they may not be aware of depressurization times. This can lead to customer dissatisfaction and confusion. For example, the vehicle operator may have to wait a long time for depressurization to be complete without being aware of the status of the fuel tank at any time while waiting for the tank to depressurize. This can cause the operator to not be sure if depressurization is actually occurring or if the refueling request even went through. To compensate, the operator may press the refueling button over and over again. The repeated and excessive depressurization of the refueling button may cause controller errors. While a vehicle operator may have learned, over time, the average time taken for the fuel tank of the given vehicle to depressurize, there may be significant deviations (e.g., additional delays) from the average temperature due to changes in fuel temperature, ambient temperature, etc. For example, the wait may be longer on hot days when the vehicle has been driven a long distance before refueling is requested. There may also be situations where the driver is not familiar with the vehicle, such as can occur when the vehicle is a shared vehicle or an autonomous vehicle. The driver there may not even be aware of the average time taken to depressurize the fuel tank, let alone the variations. A temporary driver of a shared vehicle, unaware of the long depressurization time, may try to force open the refueling door, causing fuel system damage. If the vehicle is being refueled at a full service gas station where an attendant refuels the vehicle (while the vehicle operator remains inside the vehicle), the attendant may not be aware of the depressurization time and may become confused when the vehicle's refueling door does not open. They may try to pry the refueling door open without success. As elaborated herein, a vehicle controller may leverage the vehicle AVAS 189 and puddle light 186 to provide a real-time update regarding the status of the fuel tank and the time remaining to complete tank depressurization.

The vehicle system 206 may further include a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, fuel tank pressure transducer (FTPT) or pressure sensor 291, and canister temperature sensor 243. As such, pressure sensor 291 provides an estimate of fuel system pressure. In one example, the fuel system pressure is a fuel tank pressure, e.g. within fuel tank 220. Other sensors such as pressure, temperature, air/fuel ratio, and composition sensors may be coupled to various locations in the vehicle system 206. As another example, the actuators may include fuel injector 266, throttle 262, PCV 253, FTIV 252, pump 292, refueling lock 245, AVAS 189, and puddle light system 186. The control system 214 may include a controller 212. The controller may receive input data from the various sensors, process the input data, and trigger the actuators in response to the processed input data based on instruction or code programmed therein corresponding to one or more routines. An example control routine is described herein with regard to FIG. 8. The controller 212 receives signals from the various sensors of FIGS. 1-2 and employs the various actuators of FIGS. 1-2 to adjust engine operation based on the received signals and instructions stored on a memory of the controller. For example, responsive to an operator refueling request, the controller may retrieve sensor input from fuel tank pressure sensor 291 and compare it to a threshold. If the pressure is higher than the threshold, the controller may send a signal commanding one or both of FTIV 252 and PCV 253 open so as to rapidly depressurize the fuel tank. In addition, the controller may display a countdown of the depressurization time (and a time remaining until the refueling lock will be disengaged and fuel can be received in the fuel tank) to a vehicle operator or refueling attendant via puddle light 186 coupled to a side mirror 188 of the vehicle body. Concurrently, the controller may announce the countdown via AVAS 189. Once the fuel tank has been depressurized, as inferred based on the sensor output, the controller may send a signal commanding the refueling lock to open or disengage so that fuel can be received in fuel tank 220 via filler pipe 211. Further still, a position and orientation of the displayed countdown may be adjusted based on a driver door opening angle, or based on feedback from a camera mounted on the driver side rear view mirror (such as camera 181 of FIG. 1) so that the display is clearly visible to the person refueling the vehicle.

Figure 3:
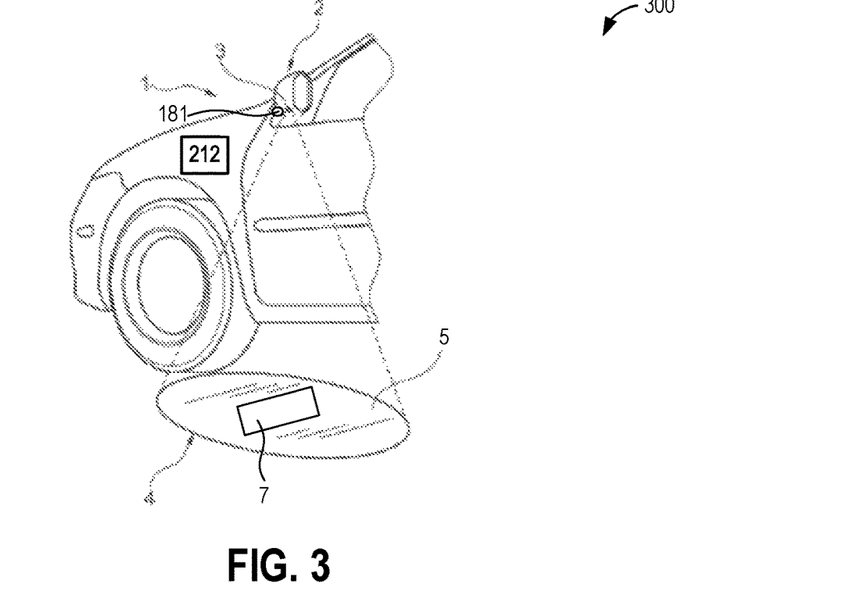
FIG. 3 shows a partial perspective view of a vehicle with an exterior rear view mirror configured with a puddle light.

Turning now to FIG. 3, an example embodiment 300 of a puddle light system coupled in a passenger vehicle 1 is shown. Vehicle 1 includes a driver-side exterior rear view mirror 2 which is equipped on the underside of its housing with a puddle light 3 which lights an area 4 on the ground 5 underneath the exterior rear view mirror 2 and next to the vehicle 1. Area 4 has an oval dimension with a defined radius along each of the major axis and the minor axis of the oval.

Rear view mirror 2 also houses a camera 181 (such as described earlier in FIG. 1) which is part of a blind spot monitoring system (or anti-collision system) that detects other vehicles located to the driver's side and rear (in the driver's blind spot). Based on images captured by the camera 181, a vehicle controller may warn the driver, through visual, audible, vibrating, or tactile cues, that there is a vehicle in the driver's blind spot. This may assist the driver is determining whether it is safe to change lanes. In addition, feedback from camera 181 may enable the vehicle controller to provide cross traffic alerts to the driver when backing out of a parking space, informing them if there is traffic approaching from the sides.

The puddle light may display an image 7 in area 4. The displayed image may include, for example, a default image, such as a default manufacturer selected image (e.g., vehicle manufacturer logo). Alternatively, the displayed image may be selected by the vehicle operator in vehicle setting preferences. Area 4 may be illuminated and display 7 projected therein responsive to a vehicle door being locked or unlocked so that the area of a ground surface outside a driver door can be viewed by the operator during entry or exit from the vehicle. This enhances operator safety when entering or leaving the vehicle.

It will be appreciated that while the depicted puddle light system is shown coupled to an underside of an exterior rear view mirror, in other examples, the puddle light system may be coupled to an underside of the driver door, or an underbody location under the driver seat of the vehicle.

As elaborated herein, responsive to a refueling request received from a vehicle driver via actuation of a refueling button on a vehicle dashboard, vehicle controller 212 may command the puddle light system to project an alternate refueling related image in area 4. The alternate refueling related image may include a countdown in real-time of the time remaining until the fuel tank is depressurized. In addition, or alternatively, the message may indicate to the driver that the refueling request has been acknowledged and is currently under way. This can help reduce customer confusion and dissatisfaction regarding depressurization delays.

When the refueling associated image is displayed, various parameters of area 4, such as a relative position of area 4 on ground 5 relative to puddle light 3, the dimensions of area 4, as well as the orientation of the major and minor axes of area 4 relative to the vehicle body, may be adjusted by a vehicle controller 212. For example, the area 4 parameters may be adjusted based on a location of a vehicle operator relative to the vehicle as well as an angle of driver door opening. As another example, feedback from camera 181 may be used to identify a location of a vehicle operator or refueling attendant (herein also referred to as "customer"), and a position and orientation of area 4 may be adjusted relative to the position of the customer so as to enable the customer to be able to see the depressurization time clearly. For example, the orientation may be adjusted so that the depressurization time displayed in area 4 is in front of the customer. As another example, a size of the area and/or font used in the area 4 may be adjusted based on an estimated height of the customer. Still other adjustments may be possible.

The display in area 4 can be activated when the passenger car is keyed-off and a refueling request is received. Responsive to the fuel tank needing depressurization, area 4 may display a time remaining until depressurization of the fuel tank is complete.

Figure 4:
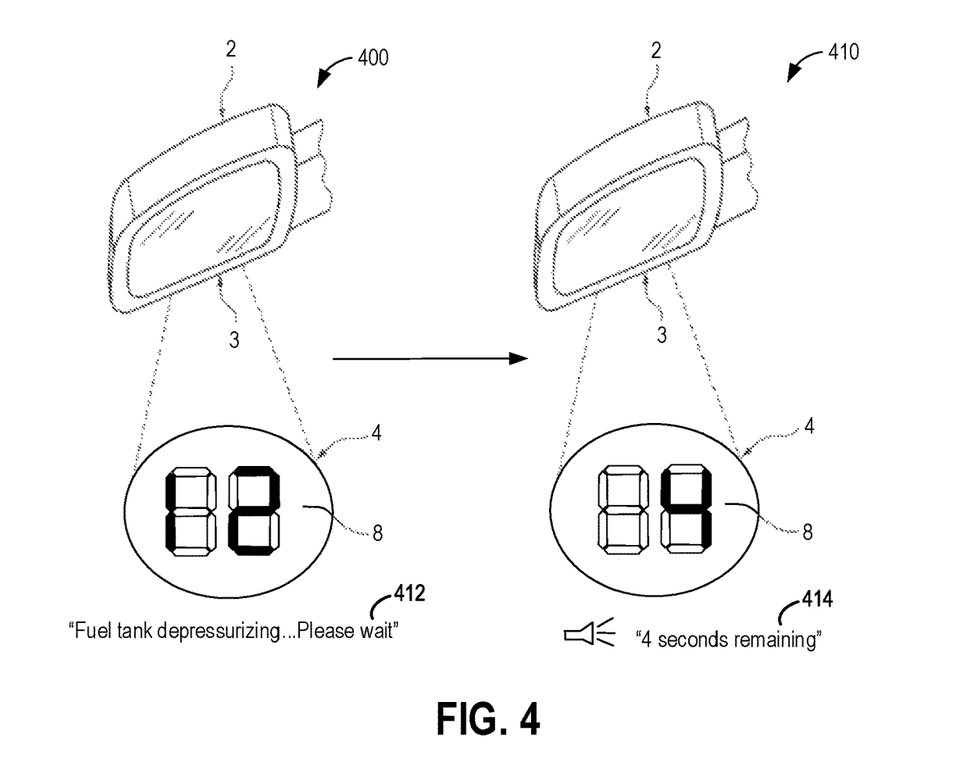
FIG. 4 shows an example fuel system status display, as projected by a puddle light of a vehicle, during a hybrid vehicle refueling event.

One example of such a scenario is shown at FIG. 4. Components previously introduced are not reintroduced for reasons of brevity. At 400, area 4 displays, in real-time, an initial time until depressurization of a fuel tank in the form of block-like circular segments 8, in a way that is analogous to a digital clock. For example, it is depicted that 12 seconds remain until the tank is depressurized. In other embodiments, the remaining time may be displayed in an alternate font. Area 4 may also include a text-based message 412 acknowledging the receipt of the refueling request. For example, message 412 may state "Fuel tank depressurizing . . . Please wait". This provides the operator or refueling attendant a visual cue as to depressurization progress. At 410, the initial time is counted down in real-time. For example, it is depicted that 4 seconds remain until the tank is depressurized. While the unit (seconds, in this case) is not depicted, it may be a default unit that is implied. Alternatively, the unit may also be displayed (e.g., via a digital "s"). In addition to displaying an image in area 4, the controller may also provide an audible cue to the operator. For example, the AVAS system of the vehicle may be leveraged to provide an auditory message 414 regarding the real-time countdown, such as by announcing that 4 seconds are remaining. The combination of audible messages and visual messages may allow the operator to have a better knowledge of the fuel system status, reducing driver and/or refueling attendant confusion and associated issues.

Figure 5:
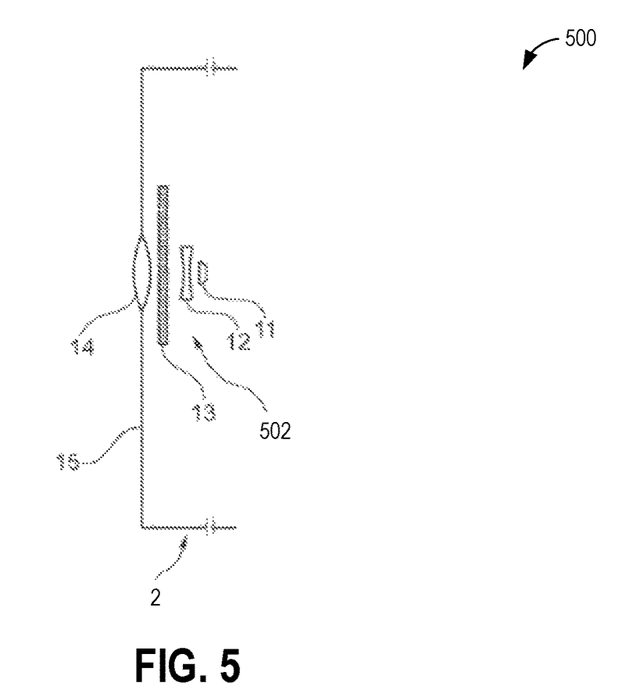
FIG. 5 shows a cross-sectional view of an example lighting arrangement of the puddle light coupled to an exterior rear view mirror of a vehicle.

An example puddle display system 500 is depicted at FIG. 5. The display system includes an optical and lighting arrangement positioned within an exterior rear view mirror to enable the projection of a display onto an area on a ground outside the vehicle. Specifically, in order to generate a display (such as the display projected on area 4 of FIGS. 3-4) on the ground, a lighting arrangement 502 is provided. Lighting arrangement 502 is composed of a light emitting diode (LED) 11 as a light source, a first lens 12, a transparent LCD display 13 and a second lens 14 in a lower housing wall 15 of the exterior rear view mirror 2. The first lens is shown as a concave lens while the second lens is shown as a convex lens. However, other lenses or combinations of lenses may be provided that generate the desired display. While the light source is depicted as an LED, other light sources may also be used without departing from the scope of this disclosure. The lighting arrangement is controlled in accordance with command signals received from controller 212. The controller 212 controls the display 13, light source 11, and lenses 12, 14 in a way to project a desired representation into area 4. The light from the LED 11 then illuminates in a focused fashion through the display 13, and the result is focused in turn onto the ground via lenses 12, 14.

Further, the exterior rear view mirror may house a camera system (such as camera 181 of FIG. 3), which may be a surround 360 degree camera system. Based on feedback from the camera system, the projection into area 4 may be adjusted. In one example, prior to projecting the light, the side mounted camera system may image the surface type to learn a contrast (dark vs light). Depending on the surface color, different shades of LED lights may be used for the projection to yield maximum contrast. For example, instead of projecting white color on a light surface, white color may be projected on a blacktop.

In this way, the components of FIGS. 1-5 enable a vehicle system comprising: a fuel system including a fuel tank, a fuel vapor canister, a valve coupling the canister to the fuel tank, a fuel tank pressure sensor, a filler pipe for receiving fuel in the fuel tank from a source external to the vehicle, and a refueling lock for controlling access to the filler pipe; a refueling button coupled to a vehicle dashboard for receiving an operator request to refill the fuel tank; a vehicle body including a driver door, a refueling door coupled to the filler pipe, and an exterior rear view mirror coupled outside the driver door; a puddle light system coupled to an underside of the exterior rear view mirror, the puddle light system including a light source and a lens for projecting an image onto a ground surface adjacent the vehicle body; an acoustic vehicle alerting system (AVAS) including a speaker and a microphone mounted on an exterior surface of the vehicle body; and a controller with computer-readable instructions stored on non-transitory memory which when executed cause the controller to: responsive to operator actuation of the refueling button, indicate in real-time, via one or more of the puddle light system and the AVAS, an estimated duration until the fuel tank is depressurized and fuel can be received via the filler pipe. As an example, the indicating may include projecting, in real-time, the estimated duration via the puddle light system onto the ground surface; and concurrently annunciating, via the AVAS, the estimated duration to a vehicle surrounding. The controller may be configured with further instructions to adjust a location, size, and orientation of the estimated duration projected on the ground surface relative to the vehicle body as a function of vehicle occupancy and driver door angle of opening. Furthermore, the controller may be configured with instructions to adjust a volume of the estimated duration annunciated to the vehicle surrounding as a function of ambient noise level, volume of music being played inside the vehicle via an entertainment system (e.g., speakers). In further examples, in-cabin music may be discontinued during the countdown. An on-board cabin microphone (or exterior microphone of an AVAS system), may be used to learn the ambient sound. Then, a volume of the interior or exterior speakers may be adjusted to be higher than the ambient sound level. In still further examples, a vehicle window (e.g., window coupled to driver door) may be rolled down during this step if interior speakers are used to annunciate the countdown.

Figure 6:
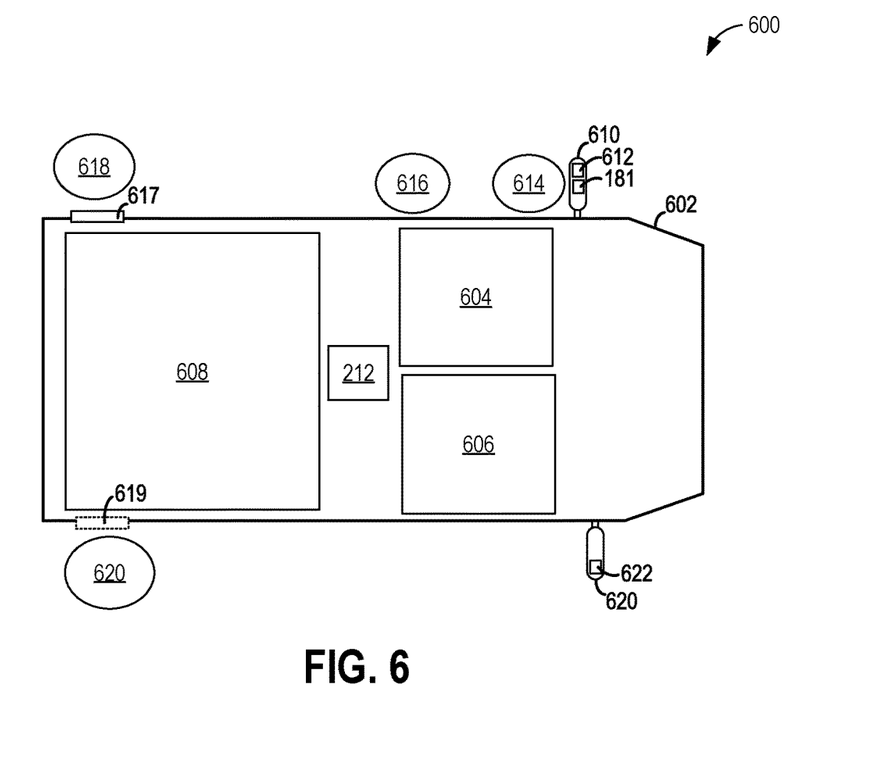
FIG. 6 shows a plan view of the vehicle of FIG. 3 including a projection location of the puddle light.
Figure 7:
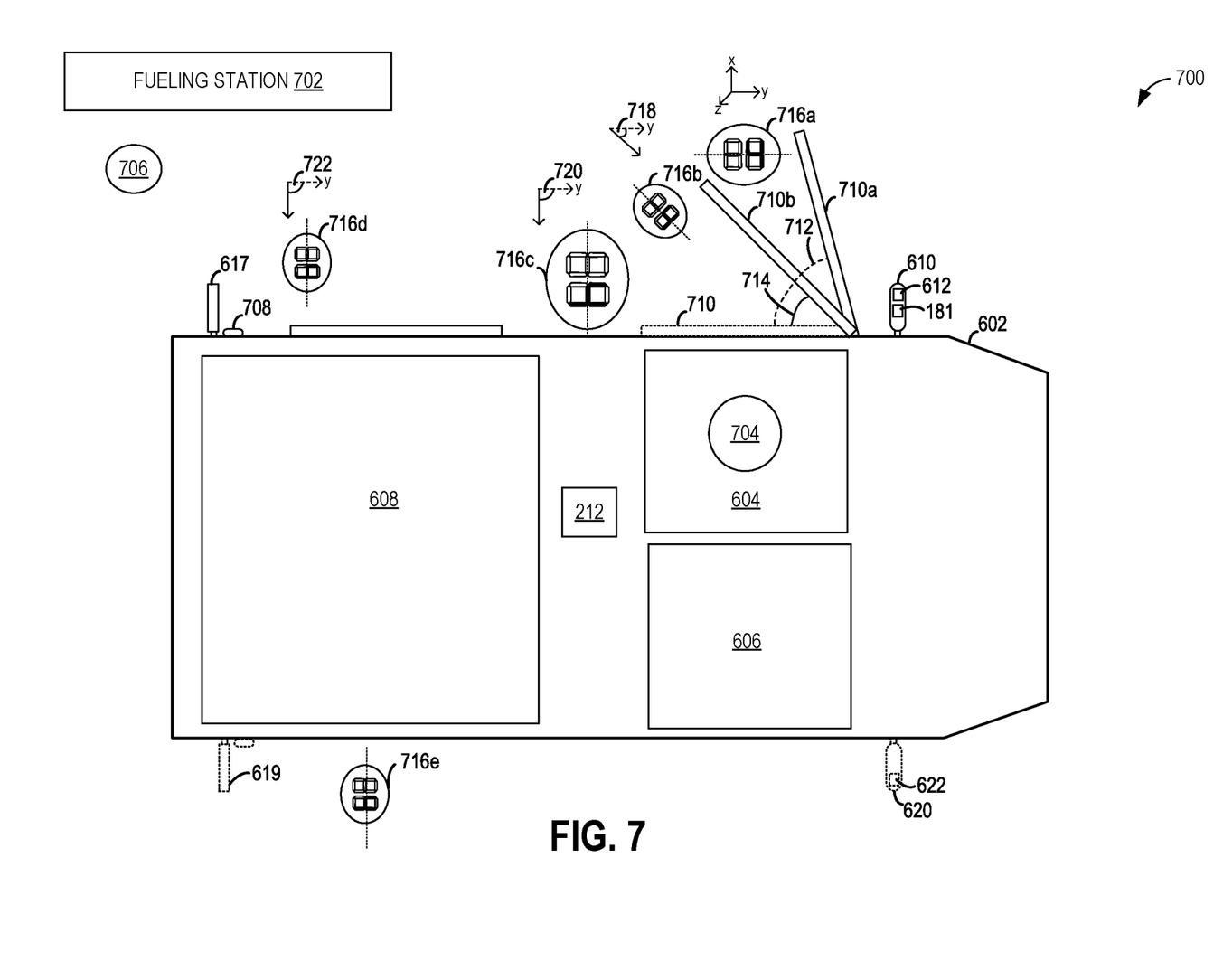
FIG. 7 shows example variations in a puddle light projection angle for displaying a fuel system status.

Turning now to FIG. 6, a plan view 600 of a passenger vehicle 602 is shown depicting possible locations for projecting a fuel tank depressurization time via a puddle light system. Vehicle 602 includes a cabin having a rear passenger area 608, a driver area 604, and a front passenger area 606. An exterior rear view mirror 610 positioned outside of a door of the driver area includes the puddle light system 612, such as the puddle lights described with reference to any of FIGS. 1-5.

As a first example, the puddle light system 612 may project a display onto an area 614 located immediately below the rear view mirror 610 and immediately outside driver area 604. In one example, a vehicle controller 212 may adjust puddle light system components to project a fuel tank depressurization time in area 614 when the vehicle operator is determined to be seated in the driver area, such as via input from a driver seat sensor. By projecting at this location, the vehicle operator may be able to see the time while seated in the driver seat.

As a second example, the puddle light may project a display onto an area 616 located outside driver area 604, and towards passenger area 608. In one example, a vehicle controller 212 may adjust an angle of projection of the display provided by the puddle light system components in area 616 when the vehicle operator is determined to not be seated in the driver area, such as via input from the driver seat sensor. By projecting at this location, the vehicle operator may be able to see the time while standing outside the driver seat.

As a third example, the puddle light may project a display onto an area 618 located immediately a refueling door 617, wherein the refueling door is located on the same side of the vehicle body as a door of the driver area 604. In one example, a vehicle controller 212 may adjust puddle light system components to project a fuel tank depressurization time in area 616 when the vehicle is determined to be refueled by a refueling attendant (or gas station attendant) who is not the vehicle driver (such as mandated in some states). By projecting at this location, the refueling attendant may be able to see the time while waiting to fuel the vehicle.

As a fourth example, the puddle light may project a display onto an area 620 located immediately a refueling door 619, wherein the refueling door is located on the opposite side of the vehicle body as a door of the driver area 604, and on the same side of the vehicle body as a door of the front passenger area 606. In one example, a vehicle controller 212 may adjust puddle light system components to project a fuel tank depressurization time in area 618 when the vehicle is determined to be refueled by a refueling attendant (or gas station attendant) who is not the vehicle driver (such as mandated in some states). By projecting at this location, the refueling attendant may be able to see the time while waiting to fuel the vehicle. In such a situation, a puddle light system 622 coupled to an exterior rear view mirror 620 outside the front passenger area may be employed.

It will be appreciated that while the above examples discuss adjusting the size and orientation of displays 614-620 based on driver seat sensor feedback, in other examples, the adjusting may be based on feedback from a sensor coupled to the driver door, the sensor indicative of an angle of opening of the driver door, or the adjusting may be based on feedback from blind spot monitoring camera 181 mounted on the side rear view mirror 610. For example, when the camera 181 feedback is indicative of the operator being seated in the vehicle, the display may be projected in area 614 and oriented towards the vehicle body. As another example, when the camera 181 feedback is indicative of the operator standing outside the driver door of the vehicle, the display may be projected in area 614 and oriented away the vehicle body. As yet another example, when the camera 181 feedback in indicative of the operator standing outside a refueling station, by the refueling door, the display may be projected in area 618 and oriented perpendicular to the vehicle body. Further examples are elaborated with reference to FIG. 7.

It will be appreciated that the controller may similarly provide multiple projections concurrently, such as in area 614 for viewing by the vehicle operator as well as area 618 for viewing by the refueling attendant. Further, as elaborated with reference to FIG. 7, the controller may adjust projection parameters such as a size of the projection, an angle of projection, as well as font or color of the projection based on various vehicle operating parameters.

Turning now to FIG. 7, a plan view 700 of passenger vehicle 602 is shown depicting example changes to projection parameters when projecting a fuel tank depressurization time via a puddle light system. Vehicle 602 may be the vehicle of FIG. 6 that has already been introduced. Vehicle 602 is shown parked outside a refueling station 702 where a refueling attendant 706 is available to refuel the vehicle. A vehicle operator 704, seated in driver area 604, may have indicated a request for refueling the vehicle, such as via actuation of a refueling button. Responsive to the refueling request, a refueling door 617 may be opened and fuel may be received in the vehicle's fuel tank via fuel opening 708 when the fuel tank has sufficiently depressurized. The time to complete depressurization may be estimated by controller 212 based on fuel system conditions, such as fuel tank pressure and ambient temperature. The time to depressurize is then displayed via a puddle light 612 coupled to underside of an exterior rear view mirror 610, the mirror coupled to the vehicle body outside the driver area 604. In particular, puddle light 612 may project the time as display 716 (examples of which are shown as 716a-e). A location, size, and orientation of display 716a-e may be varied by controller 212 based on various vehicle conditions, such as the presence or absence of a driver in the driver area 604 and/or the degree of opening of driver door 710, as inferred from a door position sensor, or a blind spot monitor camera 181 coupled to the driver side rear view mirror 610.

As an example, when the driver door is at a fully open position, such as shown at 710a, the time to depressurization may be projected as display 716a. In the fully open position, the driver door makes an angle 712 (dashed angle). In response to the driver door being fully open, display 716a is projected at a size that covers an area confined within the area swept by the driver door. In the depicted example, display 716a is oval shaped and is oriented such that the major axis of the oval (shown as a dashed line running through the major diameter of the oval) is aligned with the y-axis of the depicted reference axes x,y,z. When the door is fully open, it may be assumed that the driver is seated in the driver area. Additional input may be received from a seat sensor in the driver area. As a result of aligning the major axis of display 716a with the reference y-axis (and thereby parallel to the vehicle body's side surface), a driver seated in the driver area with the driver door open may be easily able to see the time to depressurize and initiate fueling accordingly.

As another example, when the driver door is at a partially open position, such as shown at 710b, the time to depressurization may be projected as display 716b. In the partially open position, the driver door makes an angle 714 (solid angle). In response to the driver door being partially open, display 716b is projected at a size that covers an area confined within the area swept by the partially open driver door. In the depicted example, display 716b is smaller than display 716a. However, in alternate examples, they may be the same size or display 716b may be larger than display 716a. Display 716b is also shown to be oval shaped and is oriented such that the major axis of the oval is at an angle 718 relative to the y-axis of the depicted reference axes x,y,z. In particular, angle 718 may be adjusted such that the major axis of display 716b is substantially parallel to the partially open driver door 710b. When the door is partially open, it may be assumed that the driver is not seated in the driver area. Additional input may be received from a seat sensor in the driver area. As a result of aligning the major axis of display 716b at an angle relative to the reference y-axis (and thereby parallel to the driver door), a driver standing outside the vehicle may be easily able to see the time to depressurize and initiate fueling accordingly.

As yet another example, when the driver door is at a fully closed position, such as shown at dashed 710, the time to depressurization may be projected as display 716c. In the fully closed position, the driver door is aligned with the vehicle body's side surface. In response to the driver door being fully closed, display 716c is projected at a size that is larger than the size at which the display is projected when the driver door is open. However, in alternate examples, they may be the same size or display 716c may be smaller than display 716a or 716b. Display 716c is also shown to be oval shaped and is oriented such that the major axis of the oval is at an angle 720, substantially perpendicular to the y-axis of the depicted reference axes x,y,z. In particular, angle 720 may be adjusted such that the major axis of display 716c is substantially perpendicular to the closed door 710. When the door is fully closed, it may be assumed that the driver is standing outside the vehicle, looking towards the vehicle door. Alternatively, it may be assumed that the driver is inside the vehicle and that a refueling attendant is standing outside the vehicle, by refueling station 702. Furthermore, the driver or the refueling attendant 706 who is outside the vehicle is expected to be standing in the vicinity of the refueling door 617, waiting to refuel the vehicle. Therefore, by enlarging the display 716c and orienting it such that the major axis of display 716c is oriented perpendicular to the driver door, a driver standing outside the vehicle may be easily able to see the time to depressurize and initiate fueling accordingly. Once the countdown has been completed on the display, the vehicle operator (or driver) or the refueling attendant can dispense fuel into the vehicle via fuel opening 708.

As discussed with reference to FIG. 6, the time to depressurization may alternatively or additionally be projected as display 716e when refueling door 619 is on the passenger side of the vehicle, opposite the driver side. In this situation, irrespective of the driver door position, the time to depressurize may be displayed at an orientation wherein the major axis of the oval is at substantially perpendicular to the vehicle body, and substantially parallel to the open refueling door 619. In this case, the display 716e may be provided via a puddle light 622 coupled to an exterior rear view mirror 620 on the passenger side of the vehicle. As a result of the depicted orientation, a driver or fueling attendant standing outside refueling door 619 may be easily able to see the time to depressurize and initiate fueling accordingly. In some embodiments, display 716e may be provided concurrent to any of display 716a-c.

It will be appreciated that while the above examples adjust the parameters with reference to feedback from a sensor coupled to the driver door indicative of driver door opening degree, the adjusting may be additionally or alternatively based on feedback from blind spot monitoring camera 181 mounted on the side rear view mirror 610. For example, when the camera 181 feedback is indicative of the operator being seated in the vehicle, the display may be projected as 716a, facing the driver seated in the vehicle. As another example, when the camera 181 feedback is indicative of the operator standing outside the vehicle, the controller may estimate the position and orientation of the operator relative to the vehicle body and adjust the display projection angle and location accordingly, such as at 716b or 716c. The size may be enlarged as the estimated operator position becomes closer to a rear end of the vehicle as compared to a front end of the vehicle. The position, size and orientation may be further adjusted to account for the height (and thereby the focal point) of the operator. As yet another example, when the camera 181 feedback in indicative of the operator standing outside a refueling station, the controller may infer the position of the operator relative to the refueling door based on the camera feedback, and the display may be projected as 716b.

Figure 8:
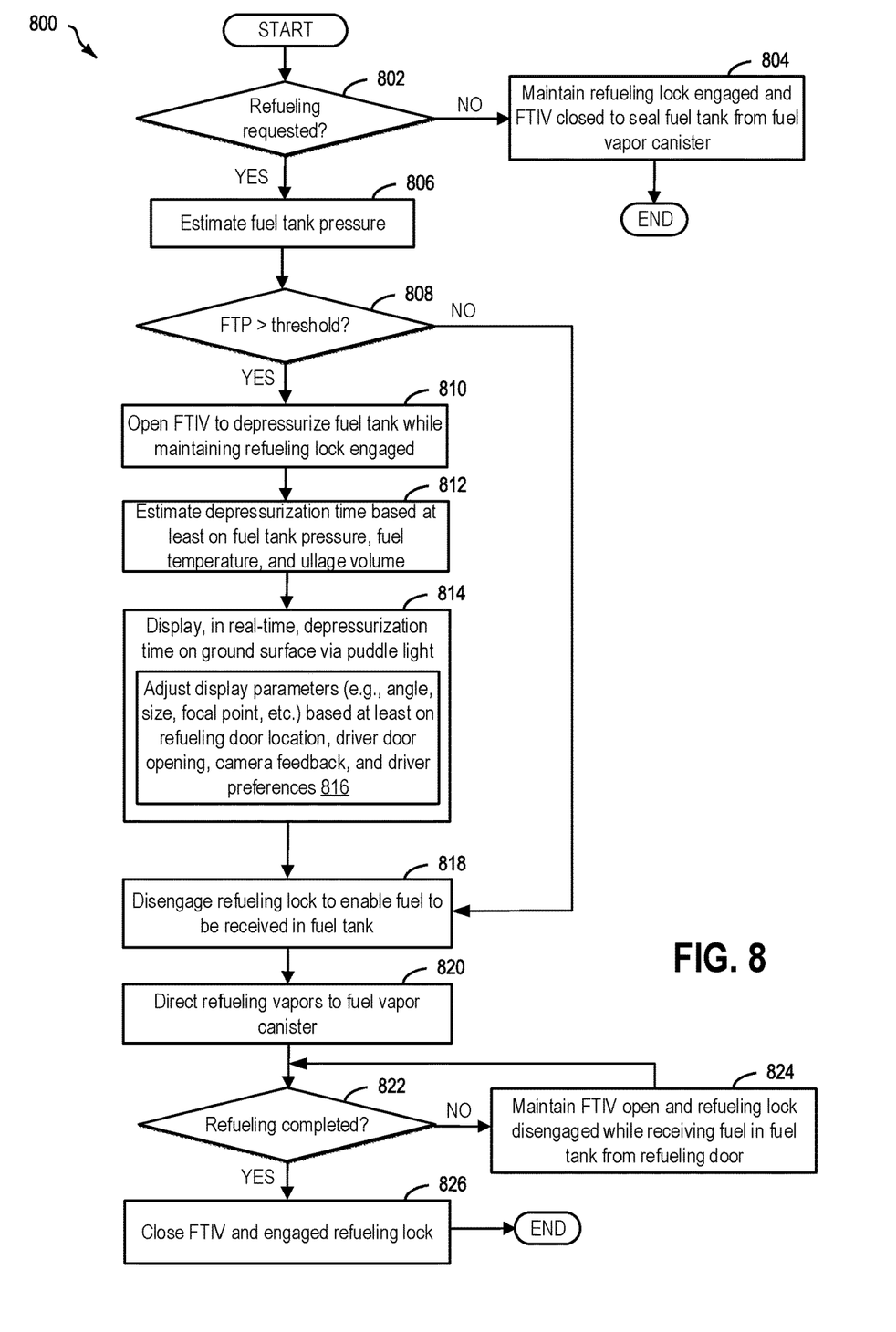
FIG. 8 shows a high level flow chart of an example method for a refueling event in a hybrid vehicle including displaying of a time remaining until fuel tank depressurization via a vehicle puddle light.

Turning now to FIG. 8, an example method 800 is shown for estimating and displaying a time remaining before a fuel tank is depressurized and fuel can be dispensed into a vehicle. The method enables a refueling event to occur with reduced customer dissatisfaction. Instructions for carrying out method 800 may be executed by a controller based on instructions stored on a memory of the controller and in conjunction with signals received from sensors of the vehicle system, such as the sensors described above with reference to FIGS. 1-2. The controller may employ actuators of the vehicle system to adjust a vehicle display, according to the methods described below.

At 802, the method includes confirming if refueling has been requested. In one example, refueling may be requested by a vehicle operator by actuating a refueling button in a vehicle display. If refueling is not requested, at 804, a controller may maintain a refueling lock of the fuel system engaged to disable fuel from being dispensed into the fuel tank. In addition, the controller may maintain a FTIV closed to seal the fuel tank from the fuel vapor canister. As a result, fuel vapors generated in the fuel tank (such as from diurnal cycles or running loss) are retained in the fuel tank.

If a refueling request is confirmed, then at 806, the method includes estimating a fuel tank pressure, such as via a fuel tank pressure transducer coupled to the fuel tank. Alternatively, the fuel tank pressure may be inferred based on engine operating conditions such as duration and load of engine operation, and a rate of fuel consumption.

At 808, the method includes comparing the estimated fuel tank pressure (FTP) to a non-zero threshold. The threshold may correspond to a pressure level above which fuel tank integrity may be compromised, such as due to excessive fuel tank pressure being present. The threshold may be based on size, dimensions, and configuration of the fuel tank, as well as the material that the fuel tank is made of. Further, the threshold may be a function of the fuel type (e.g., octane rating or alcohol content) received in the fuel tank. If the fuel tank pressure is not higher than the threshold, then the method moves to 818 to disengage the refueling lock of the fuel system to enable fuel to be received in fuel tank.

Else, if the fuel tank pressure is above the threshold (or if the difference between the estimated fuel tank pressure and the threshold is higher than a threshold difference), then at 810, the method includes commanding the FTIV open to depressurize the fuel tank while maintaining the refueling lock engaged. This allows the fuel tank to be depressurized and fuel cannot be added to the fuel tank while the tank is pressurized. By disabling fuel from being added into the fuel tank until the fuel tank is sufficiently depressurized, the operator or attendant adding the fuel is protected from getting sprayed with fuel mist.

Next, at 812, the method includes estimate a depressurization time based at least on fuel tank pressure, fuel temperature, and fuel tank ullage volume. For example, the controller may use a look-up table, algorithm, or model to estimate an amount of time it will take to depressurize the fuel tank from the higher than threshold pressure to a lower than threshold pressure. In another example, the threshold is an upper threshold, and the controller may estimate an amount of time it will take to depressurize the fuel tank from a higher than upper threshold pressure to a lower than a lower threshold pressure. The estimated time may increase as the fuel tank pressure increases, as the fuel temperature increases, and/or as the vapor space or ullage volume in the fuel tank decreases. The vapor space or ullage volume of the fuel tank may be determined as a function of the fuel tank fill level, the space decreasing as the fill level increases.

At 814, the method includes displaying the estimated depressurization time on a ground surface next to the vehicle via the use of a puddle light. As described with reference to FIG. 3, a puddle light of the vehicle may be coupled to an underside of a driver side exterior rear view mirror for providing light on the ground surface when the vehicle is locked or unlocked. This allows the area outside the vehicle driver door to be illuminated during operator entry or exit into/from the vehicle. The puddle light may usually project an image fuel into it via a controller onto the ground surface. Further, during a refueling event, the puddle light may be leveraged for projecting a countdown of the estimated depressurization time, as well as any messages related to the fuel tank depressurization. For example, the puddle light may display, in real-time, the number of seconds remaining until the fuel tank is fully depressurized. As another example, the puddle light may display a message indicating to the customer (which may be the vehicle operator or a refueling attendant) that the fuel tank is depressurizing, such as "Fuel Tank depressurizing . . . please wait". This allows the customer to receive real-time feedback information about the status of the fuel tank, such as how long it will take before the fuel door will open and refueling can be commenced. This can preempt a car sharing customer from attempting to open the fuel door prematurely. Also, by displaying the countdown, the vehicle driver may receive an acknowledgement that the refuel request button did engage and that the refueling request is being honored.

In some examples, the puddle light may have a default display or image that is projected whenever the puddle light is actuated. The default image may be a manufacturer logo, or other vehicle manufacturer selected image. Alternatively, the default image may be an image selected by the vehicle operator as a part of vehicle default settings. If the puddle light is actuated responsive to a refueling request, the controller may disable projection of the default image and instead replace the default image with the depressurization associated countdown and associated message. Alternatively, during a first vehicle shutdown, when vehicle refueling is not requested, the controller may display a first image via the puddle light, in response to a key fob being actuated or a vehicle driver door being actuated open or closed (or the door being locked or unlocked). The first image projection parameters may be predefined and may be independent of vehicle driver door status (e.g., whether it is actuated open or closed, whether the door is locked or unlocked, etc.). In comparison, during a second, different vehicle shutdown, when vehicle refueling is requested, the controller may display a second, different image via the puddle light, in response to a refueling button being actuated. The second image projection parameters may then be adjusted based on vehicle driver door status (e.g., whether it is actuated open or closed, whether the door is locked or unlocked, etc.).

As described with reference to the example displays of FIGS. 6-7, displaying the depressurization time may include, at 816, the controller adjusting one or more display parameters (e.g., angle, size, area or projection, focal point, orientation, etc.) based at least on refueling door location, driver door opening angle, driver location based on feedback from a blind spot monitoring camera coupled to a rear view mirror, and driver preferences. For example, when the driver door is fully open or when the driver is in a first location relative to the vehicle, the display may be projected at a first distance and a first angle from the puddle light, the display having a first area. In comparison, when the driver door is fully closed or partially open, or when the driver is in a second, different location relative to the vehicle, the display may be projected at a second distance and a second angle from the puddle light, the display having a second area. The second distance may be closer to or further from the puddle light relative to the first distance, the second angle may be closer to or further from the puddle light relative to the first angle, and the second area may be larger or smaller than the first area.

In still further examples, such as where the vehicle system is configured with an acoustic vehicle alerting system (AVAS) for alerting pedestrians outside the vehicle that a vehicle is nearby (since HEVs and start-stop vehicles tend to be very quiet), the countdown may be announced in addition to being displayed by the puddle light. Therein the acoustic message and displayed message may occur concurrently. This informs the customer, audibly, of the amount of time needed before refueling can occur.

The method then moves to 818 after the tank has fully depressurized. At 818, the controller provides signals to disengage the refueling lock to enable fuel to be received in fuel tank after the countdown is completed and the fuel tank is sufficiently depressurized. At 820, the FTIV may be opened to direct refueling vapors to the fuel vapor canister. This allows refueling vapors generated while fuel is dispensed into the fuel tank to be captured and retained at the fuel vapor canister for purging later.

At 822, it is determined if refueling is completed, such as may occur when the fuel tank reaches a fill level corresponding to a maximum capacity of the fuel tank. If not, then at 824, the controller may maintain the FTIV open and the refueling lock disengaged while receiving fuel in fuel tank via the refueling door. Else, once refueling is completed, at 824, the controller commands the FTIV closed and engages the refueling lock. This seals the fuel tank from the canister until a subsequent fuel tank depressurization or refueling event.

In this way, during a refueling event, a vehicle operator or refueling attendant may be appraised, in real-time, of an amount of depressurization time remaining before fuel can be dispensed into a fuel tank. The technical effect of providing a visual update via a puddle light and/or an audible update via vehicle speakers and microphones is that vehicle customer confusion and dissatisfaction related to delays in fuel door opening are reduced. Car sharing customers not familiar with a vehicle may also be preempted from attempting to open the fuel door prematurely or forcefully. The displayed countdown may also serve as an acknowledgement for the vehicle operator that a refueling request was received and is being processed. As such, this may preempt a customer from repeatedly pressing a refueling button on the vehicle's dashboard, thereby reducing controller errors.

One example vehicle method comprises: responsive to a refueling request, estimating a time until a fuel tank is depressurized; displaying the estimated time via a puddle light coupled to an exterior rear view mirror of the vehicle. In the preceding example, additionally or optionally, the estimated time is displayed as an image on a ground surface outside a parking location of the vehicle. In any or all of the preceding examples, additionally or optionally, the method further comprises adjusting one or more parameters of the image displayed on the ground surface as a function of opening angle of a driver door of the vehicle and a location of a vehicle refueling door relative to the driver door, the one or more parameters including image size, image location on the ground surface relative to the puddle light, and image orientation. In any or all of the preceding examples, additionally or optionally, the adjusting includes displaying the image with a first orientation when the driver door is fully open, the first orientation being substantially parallel to a fully closed driver door; and displaying the image with a second orientation when the driver door is fully closed, the second orientation being substantially perpendicular to the fully closed driver door. In any or all of the preceding examples, additionally or optionally, the adjusting includes displaying the image at a first size at a first location proximate the driver door when the driver door is fully open; and displaying the image at a second size, larger than the first size, at a second location proximate the refueling door when the driver door is fully closed. In any or all of the preceding examples, additionally or optionally, the displaying includes replacing a default image projected by the puddle light on the ground surface with the image representative of the estimated time. In any or all of the preceding examples, additionally or optionally, the displaying the estimated time includes displaying a countdown until elapse of the estimated time. In any or all of the preceding examples, additionally or optionally, the refueling request includes actuation of a refueling button on a vehicle dashboard, the method further comprising, announcing, via an external speaker of the vehicle, the countdown until elapse of the estimated time. In any or all of the preceding examples, additionally or optionally, the method further comprises depressurizing the fuel tank by opening a valve coupling the fuel tank to a fuel vapor canister, the valve maintained open until refueling of the fuel tank is completed. In any or all of the preceding examples, additionally or optionally, the depressurizing is responsive to sensed fuel tank pressure being higher than a threshold pressure. In any or all of the preceding examples, additionally or optionally, the method further comprises maintaining a refueling lock engaged and access to the fuel tank via a filler pipe disabled while the fuel tank is depressurized, and after the estimated time has elapsed, disengaging the refueling lock to enable access to the fuel tank via the filler pipe.

Another example method for a vehicle comprises: responsive to a request to refill a fuel tank, maintaining a refueling lock engaged while depressurizing a fuel tank; displaying in real-time, via a puddle light, a countdown of time remaining until the fuel tank is depressurized on a ground surface outside the vehicle; and disengaging the refueling lock after the time has elapsed. In any or all of the preceding examples, additionally or optionally, the method further comprises annunciating, via a vehicle alerting system speaker, the countdown of time remaining until the fuel tank is depressurized, the annunciating occurring concurrent to the displaying. In any or all of the preceding examples, additionally or optionally, the method further comprises adjusting a location, size, and orientation of the displayed countdown as a function of driver door opening degree, driver seat sensor output, blind spot camera feedback, and vehicle configuration including position of refueling door relative to the driver door. In any or all of the preceding examples, additionally or optionally, the method further comprises estimating the time remaining until the fuel tank is depressurized as a function of each of fuel temperature, ambient temperature, fuel tank pressure, and fuel tank fill level. In any or all of the preceding examples, additionally or optionally, displaying via the puddle light includes replacing a default image displayed by the puddle light on the ground surface with the real-time countdown of time remaining until the fuel tank is depressurized.

Another example system for a vehicle comprises: a fuel system including a fuel tank, a fuel vapor canister, a valve coupling the canister to the fuel tank, a fuel tank pressure sensor, a filler pipe for receiving fuel in the fuel tank from a source external to the vehicle, and a refueling lock for controlling access to the filler pipe; a refueling button coupled to a vehicle dashboard for receiving an operator request to refill the fuel tank; a vehicle body including a driver door, a refueling door coupled to the filler pipe, and an exterior rear view mirror coupled outside the driver door; a puddle light system coupled to an underside of the exterior rear view mirror, the puddle light system including a light source and a lens for projecting an image onto a ground surface adjacent the vehicle body; an acoustic vehicle alerting system (AVAS) including a speaker and a microphone mounted on an exterior surface of the vehicle body; and a controller with computer-readable instructions stored on non-transitory memory which when executed cause the controller to: responsive to operator actuation of the refueling button, indicate in real-time, via one or more of the puddle light system and the AVAS, an estimated duration until the fuel tank is depressurized and fuel can be received via the filler pipe. In any or all of the preceding examples, additionally or optionally, the indicating includes projecting, in real-time, the estimated duration via the puddle light system onto the ground surface; and concurrently annunciating, via the AVAS, the estimated duration to a vehicle surrounding. In any or all of the preceding examples, additionally or optionally, the controller includes further instructions that cause the controller to adjust a location, size, and orientation of the estimated duration projected on the ground surface relative to the vehicle body as a function of vehicle occupancy and driver door angle of opening. In any or all of the preceding examples, additionally or optionally, the controller includes further instructions that cause the controller to adjust a volume of the estimated duration annunciated to the vehicle surrounding as a function of ambient sound, the volume increased as the ambient sound increases. In a further representation, the ambient sound may be estimated via one or more vehicle speakers and microphones, including interior and exterior microphones. Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle method, comprising:
   responsive to a refueling request,
   estimating a time until a fuel tank is depressurized; and
   displaying the estimated time via a puddle light coupled to an exterior rear view mirror of the vehicle.

2. The method of claim 1, wherein the estimated time is displayed as an image on a ground surface outside a parking location of the vehicle.

3. The method of claim 2, further comprising adjusting one or more parameters of the image displayed on the ground surface as a function of opening angle of a driver door of the vehicle and a location of a vehicle refueling door relative to the driver door, the one or more parameters including image size, image location on the ground surface relative to the puddle light, and image orientation.

4. The method of claim 3, wherein the adjusting includes:
displaying the image with a first orientation when the driver door is fully open, the first orientation being substantially parallel to a fully closed driver door; and
displaying the image with a second orientation when the driver door is fully closed, the second orientation being substantially perpendicular to the fully closed driver door.

5. The method of claim 3, wherein the adjusting includes:
displaying the image at a first size at a first location proximate the driver door when the driver door is fully open; and
displaying the image at a second size, larger than the first size, at a second location proximate the refueling door when the driver door is fully closed.

6. The method of claim 2, wherein the displaying includes replacing a default image projected by the puddle light on the ground surface with the image representative of the estimated time.

7. The method of claim 1, wherein displaying the estimated time includes displaying a countdown until elapse of the estimated time.

8. The method of claim 7, wherein the refueling request includes actuation of a refueling button on a vehicle dashboard, the method further comprising, announcing, via an external speaker of the vehicle, the countdown until elapse of the estimated time.

9. The method of claim 1, further comprising, depressurizing the fuel tank by opening a valve coupling the fuel tank to a fuel vapor canister, the valve maintained open until refueling of the fuel tank is completed.

10. The method of claim 9, wherein the depressurizing is responsive to sensed fuel tank pressure being higher than a threshold pressure.

11. The method of claim 9, further comprising, maintaining a refueling lock engaged and access to the fuel tank via a filler pipe disabled while the fuel tank is depressurized, and after the estimated time has elapsed, disengaging the refueling lock to enable access to the fuel tank via the filler pipe.

12. A method for a vehicle, comprising:
responsive to a request to refill a fuel tank,
maintaining a refueling lock engaged while depressurizing a fuel tank;
displaying in real-time, via a puddle light, a countdown of time remaining until the fuel tank is depressurized on a ground surface outside the vehicle; and
disengaging the refueling lock after the time has elapsed.

13. The method of claim 12, further comprising, annunciating, via a vehicle alerting system speaker, the countdown of time remaining until the fuel tank is depressurized, the annunciating occurring concurrent to the displaying.

14. The method of claim 12, further comprising, adjusting a location, size, and orientation of the displayed countdown as a function of driver door opening degree, driver seat sensor output, blind spot camera feedback, and vehicle configuration including position of refueling door relative to the driver door.

15. The method of claim 12, further comprising, estimating the time remaining until the fuel tank is depressurized as a function of each of fuel temperature, ambient temperature, fuel tank pressure, and fuel tank fill level.

16. The method of claim 12, wherein displaying via the puddle light includes replacing a default image displayed by the puddle light on the ground surface with the real-time countdown of time remaining until the fuel tank is depressurized.

17. A system for a vehicle, comprising:
a fuel system including a fuel tank, a fuel vapor canister, a valve coupling the canister to the fuel tank, a fuel tank pressure sensor, a filler pipe for receiving fuel in the fuel tank from a source external to the vehicle, and a refueling lock for controlling access to the filler pipe;
a refueling button coupled to a vehicle dashboard for receiving an operator request to refill the fuel tank;
a vehicle body including a driver door, a refueling door coupled to the filler pipe, and an exterior rear view mirror coupled outside the driver door;
a puddle light system coupled to an underside of the exterior rear view mirror, the puddle light system including a light source and a lens for projecting an image onto a ground surface adjacent the vehicle body;
an acoustic vehicle alerting system (AVAS) including a speaker and a microphone mounted on an exterior surface of the vehicle body; and
a controller with computer-readable instructions stored on non-transitory memory which when executed cause the controller to:
responsive to operator actuation of the refueling button, indicating in real-time, via one or more of the puddle light system and the AVAS, an estimated duration until the fuel tank is depressurized and fuel can be received via the filler pipe.

18. The system of claim 17, wherein the indicating includes:
projecting, in real-time, the estimated duration via the puddle light system onto the ground surface; and
concurrently annunciating, via the AVAS, the estimated duration to a vehicle surrounding.

19. The system of claim 18, wherein the controller includes further instructions that cause the controller to adjust a location, size, and orientation of the estimated duration projected on the ground surface relative to the vehicle body as a function of vehicle occupancy and driver door angle of opening.

20. The system of claim 18, wherein the controller includes further instructions that cause the controller to adjust a volume of the estimated duration annunciated to the vehicle surrounding as a function of ambient sound, the volume increased as the ambient sound increases.

* * * * *